United States Patent
Saneto

(10) Patent No.: US 7,796,604 B2
(45) Date of Patent: Sep. 14, 2010

(54) ELECTRONIC DEVICE, AD HOC NETWORK ESTABLISHMENT METHOD, AND PROGRAM PRODUCT

(75) Inventor: Hiroshi Saneto, Hino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/405,809

(22) Filed: Mar. 17, 2009

(65) Prior Publication Data

US 2009/0238093 A1   Sep. 24, 2009

(30) Foreign Application Priority Data

Mar. 19, 2008   (JP)   ............................. 2008-072351

(51) Int. Cl.
    *H04L 12/28* (2006.01)
(52) U.S. Cl. ................. 370/395.2; 370/392; 370/395.1; 370/400; 370/401; 370/410
(58) Field of Classification Search ................ 370/392, 370/395.1, 395.2, 400, 401, 410
    See application file for complete search history.

(56) References Cited

U.S. PATENT DOCUMENTS

| | | | |
|---|---|---|---|
| 7,630,349 B2 * | 12/2009 | Freedman et al. | 370/338 |
| 2003/0161268 A1 * | 8/2003 | Larsson et al. | 370/229 |
| 2004/0095907 A1 * | 5/2004 | Agee et al. | 370/334 |
| 2007/0105573 A1 * | 5/2007 | Gupta et al. | 455/509 |
| 2008/0019324 A1 | 1/2008 | Matsumoto et al. | |

FOREIGN PATENT DOCUMENTS

| | | | |
|---|---|---|---|
| JP | 10-257561 A | | 9/1998 |
| JP | 2007-081468 A | | 3/2007 |
| JP | 2007-235683 A | | 9/2007 |
| JP | 2008-042896 A | | 2/2008 |
| JP | 2008-66870 A | | 3/2008 |

* cited by examiner

*Primary Examiner*—Ayaz R Sheikh
*Assistant Examiner*—Andrew C Lee
(74) *Attorney, Agent, or Firm*—AdvantEdge Law Group, LLC

(57) ABSTRACT

In at least one embodiment of the disclosure an electronic device includes a search unit configured to search wireless communication devices for channels provided for establishing an ad hoc network. A measuring unit is configured to measure a receiving level of wireless signals received from the devices found by the search. An allocation unit is configured to generate an allocation result for the channels by adding a predetermined weight to each of the channels based on the strength of the measured receiving level of the wireless signals. A calculating unit is configured to calculate a radio interference power for each of the channels based on the allocation result obtained by the allocation unit. An establishing unit is configured to select the channel having a smallest radio interference power as calculated by the calculating unit and establish the ad hoc network for the selected channel.

7 Claims, 4 Drawing Sheets

T1

| RSSI | WEIGHT |
|---|---|
| −70dB OR HIGHER | 2 |
| −80dB OR HIGHER AND LOWER THAN −70dB | 1 |
| LOWER THAN −80dB | 0 |

| CHANNEL | (X−4) | (X−3) | (X−2) | (X−1) | X | (X+1) | (X+2) | (X+3) | (X+4) |
|---|---|---|---|---|---|---|---|---|---|
| WEIGHT | 1 | 2 | 3 | 4 | 5 | 4 | 3 | 2 | 1 |

FIG. 3B

| SEARCH RESULT | | RSSI (dB) | RSSI WEIGHT |
|---|---|---|---|
| DEVICE NAME | USED CHANNEL | | |
| DEVICE 1 | 1 | -62 | 2 |
| DEVICE 2 | 1 | -65 | 2 |
| DEVICE 3 | 1 | -69 | 2 |
| DEVICE 4 | 1 | -68 | 2 |
| DEVICE 5 | 2 | -74 | 1 |
| DEVICE 6 | 2 | -72 | 1 |
| DEVICE 7 | 5 | -64 | 2 |
| DEVICE 8 | 6 | -78 | 1 |
| DEVICE 9 | 7 | -88 | 0 |
| DEVICE 10 | 9 | -72 | 1 |
| DEVICE 11 | 9 | -69 | 2 |
| DEVICE 12 | 10 | -73 | 1 |
| DEVICE 13 | 11 | -60 | 2 |
| DEVICE 14 | 11 | -61 | 2 |
| DEVICE 15 | 11 | -62 | 2 |
| DEVICE 16 | 11 | -62 | 2 |
| DEVICE 17 | 11 | -61 | 2 |
| DEVICE 18 | 11 | -64 | 2 |
| DEVICE 19 | 12 | -84 | 0 |
| DEVICE 20 | 12 | -85 | 0 |

FIG. 5A

| CHANNEL | ALLOCATION RESULT | RADIO INTERFERENCE POWER |
|---|---|---|
| 1 | 8 | 50 |
| 2 | 2 | 47 |
| 3 | 0 | 40 |
| 4 | 0 | 33 |
| 5 | 2 | 29 |
| 6 | 1 | 22 |
| 7 | 0 | 33 |
| 8 | 0 | 46 |
| 9 | 3 | 59 |
| 10 | 1 | 66 |
| 11 | 12 | 73 |
| 12 | 0 | 57 |
| 13 | 0 | 41 |

FIG. 5B

ELECTRONIC DEVICE, AD HOC NETWORK ESTABLISHMENT METHOD, AND PROGRAM PRODUCT

CROSS-REFERENCE

The present application claims priority from Japanese Patent Application No. 2008-072351 filed on Mar. 19, 2008, which is hereby incorporated by reference in its entirety.

BACKGROUND

International Standards IEEE 802.11, as one of wireless LAN (local area network) standards, regulates ad hoc network constituted by only electronic devices providing wireless communication, and infrastructure network providing communication via relay devices (access points).

The ad hoc network capable of communicating without any access point has been increasingly used in recent years for connection with a plurality of computers, printers, projectors or the like via the ad hoc network.

In establishing a new ad hoc network, there is a possibility that inadequate connection or poor communication may be caused when a channel producing large interference with existing wireless communication network is selected.

According to known electronic devices providing wireless communication, a user generally selects a channel to be used for the ad hoc network or a channel specified as default when establishing a new ad hoc network.

It is difficult, however, for the user to select an appropriate channel considering the surrounding radio condition before making the channel selection. This also applies to the case of selecting a default channel. In either of the cases, a channel causing less radio interference needs to be found by a trial and error method which initially selects a channel for providing wireless communication and changes the channel at the time of a generation of large radio interference, since the surrounding radio condition is not considered.

A method for controlling channels in a manner as to prevent generation of radio interference in infrastructure network containing a main unit and a sub unit has been proposed (see, for example, Japanese Patent Publication No. JP-A-10-257561). This method controls such that adjoining channels have different diffusion codes in case of a spectrum diffusion system in addition to infrastructure network. Thus, with the limitation of infrastructure network as well, this method cannot be used for channel selection at the time of establishment of a new ad hoc network.

SUMMARY

Various embodiments provide a technology for automatically selecting a channel causing less radio interference with existing wireless communication network at the time of establishment of a new ad hoc network.

An electronic device according to at least one embodiment includes a search unit which searches a device providing wireless communication for each of plural channels allowed for establishing an ad hoc network. A measuring unit measures a receiving level of wireless signals from devices found by the search. An allocation unit generates an allocation for channels through which the wireless signals are received from the devices found by the search for each of the devices while adding larger weight as the measured receiving level of the signals of the devices increases. A calculating unit calculates a radio interference power received when selecting a channel from the plural channels and establishes the ad hoc network for the selected channel based on the allocation result obtained by the allocation unit. An establishing unit selects the channel having the smallest radio interference power calculated by the calculating unit and establishes the ad hoc network for the selected channel.

In certain embodiments the calculating unit calculates the radio interference power for a channel X based on an allocation result of the channel X and an allocation result of a close channel causing radio interference with the channel X. In this case, the calculating unit may calculate the radio interference power of the channel X by giving larger weight to an allocation result of a channel having a frequency closer to that of the channel X among the channels causing the radio interference with the channel X.

As such, an appropriate channel causing less radio interference with existing wireless communication network can be automatically selected for establishment of an ad hoc network.

An ad hoc network establishment method according to certain embodiments include searching a device providing wireless communication for each of plural channels allowed for establishing ad hoc network; measuring a receiving level of wireless signals from devices found by the search; performing an allocation for channels through which the wireless signals are received from the devices found by the search for each of the devices while adding a larger weight as the measured receiving level of the signals of the devices increases; calculating radio interference power received when selecting a channel from the plural channels and establishing an ad hoc network for the selected channel based on the allocation result; selecting the channel having the smallest radio interference power calculated in the calculating; and establishing an ad hoc network for the selected channel.

The ad hoc network establishment method according to at least one embodiment is performed by an electronic device executing a software program. The program (either entirely or in part) may be installed or loaded on the electronic device via various types of computer readable media such as CD-ROM, magnetic disk, semiconductor memory, and/or a communication network.

Reference in the specification to the term "unit" may refer to not only a physical unit but also a function of the unit provided by the software program. A function of one unit or device may be provided by two or more physical units or devices. Functions of two or more units or devices may be provided by one physical unit or device. As such, the concept of a "device providing wireless communication" or "wireless communication device" includes an electronic device providing wireless communication and/or other electronic device providing wireless communication.

According to certain embodiments of the disclosure, a channel causing less radio interference with existing wireless communication network is automatically selected for establishment of a new ad hoc network.

BRIEF DESCRIPTION OF THE DRAWINGS

Non-limiting and non-exhaustive embodiments of the present disclosure will be described with reference to the accompanying drawings, wherein like reference numbers reference like elements.

FIGS. 3A and 3B show tables for an automatic channel selection ad hoc network establishment function.

FIGS. 5A and 5B illustrate examples of a search result, RSSI measurement result, allocation result, and radio interference power calculation result.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

Figure 1:
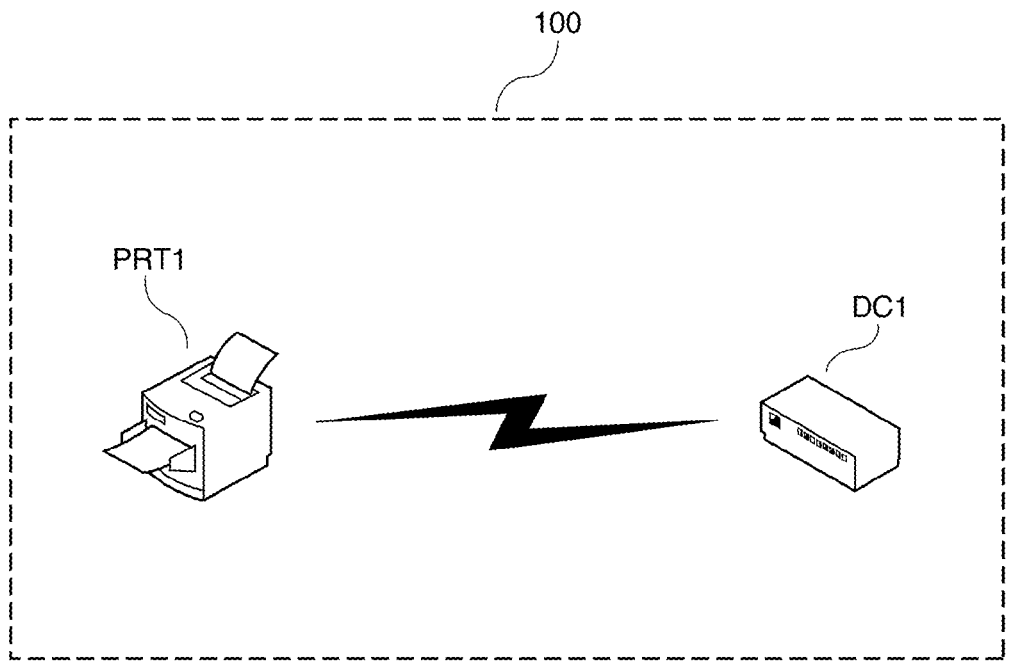
FIG. 1 illustrates a wireless communication system according to certain embodiments.

FIG. 1 illustrates a wireless communication system according to at least one embodiment of the disclosure. FIG. 1 shows a wireless LAN 100, a printer PRT 1, and a digital camera DC1 as electronic devices capable of providing ad hoc wireless communication via the wireless LAN 100.

The wireless LAN 100 is an ad hoc network constituted only by electronic devices capable of providing wireless communication without access points. According to this embodiment, the wireless communication LAN 100 is a wireless LAN in the band of 2.4 GHz in conformity with International Standards IEEE 802.11.

The printer PRT 1 has a hardware structure similar to that of an ordinary printer.

For example, the printer PRT 1 includes a print processing unit having hardware components such as a sheet feed mechanism for feeding a sheet to the inside of the printer, a printing engine for performing printing, and a sheet discharge mechanism for discharging a sheet to the outside of the printer. The printing engine generally contains a sheet feed mechanism, a carriage mechanism, a printing head and the like. The printing engine may be any of various types of printing engine allowed to be used in printers such as a serial printer for printing character by character including ink jet printer and thermal transfer printer, a line printer for printing line by line, and a page printer for printing page by page.

The printer PRT 1 further includes an information processing unit which contains hardware components such as a CPU, ROM, RAM, USB interface, wire/wireless communication interface, and console panel and other user interface.

The ROM contained in the information processing unit of the printer PRT 1 stores a software program for providing a function of a normal printer, a program for providing ad hoc wireless communication function, a program for providing automatic channel selection ad hoc network establishment function (which will be described in more detail below), and the like. These functions are performed by the CPU.

The digital camera DC1 includes hardware similar to that of an ordinary digital camera such as a CPU, RAM, ROM, CCD, liquid crystal display unit, USB interface, user interface, and wireless communication interface. The ROM of the digital camera DC1 stores program for providing function of ordinary digital camera such as image pickup function, program for providing an ad hoc wireless communication function, and the like. These functions are performed by the CPU so as to enter ad hoc network established by the printer PRT 1 and transmit images shot and stored in the RAM or the like to the printer PRT 1 via the ad hoc network for performing printing.

Figure 2:
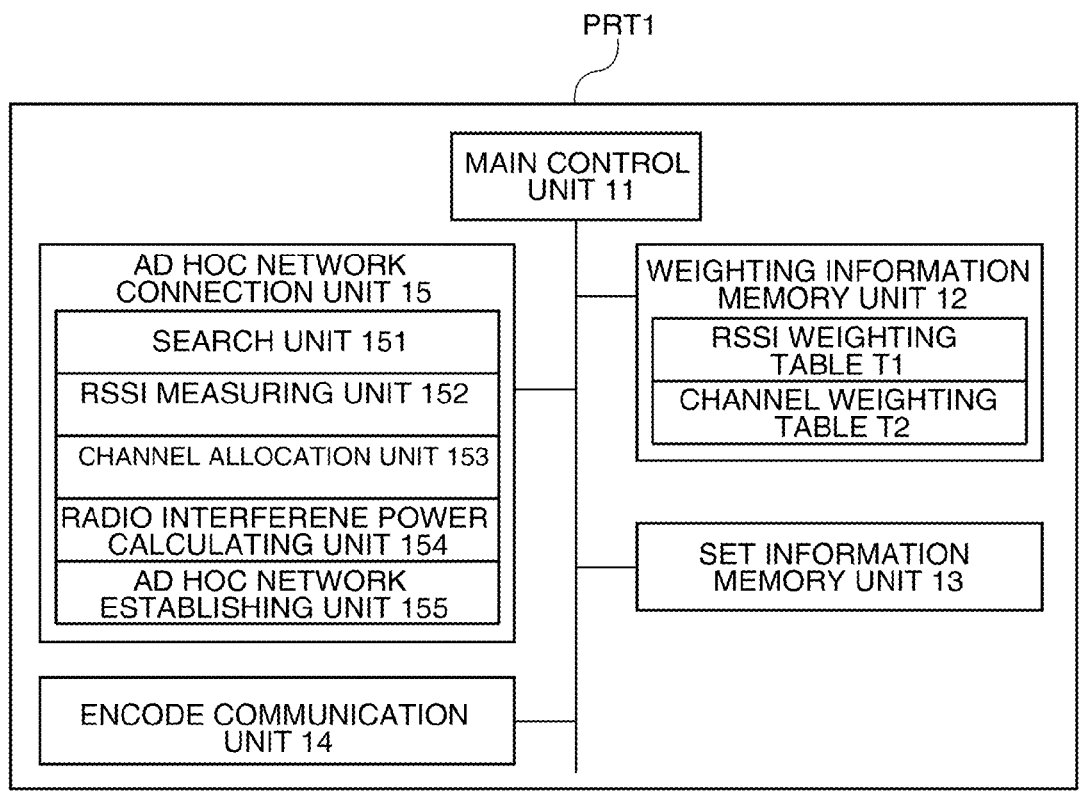
FIG. 2 is a block diagram illustrating a function structure of a printer.

FIG. 2 is a block diagram showing a function structure of an ad hoc wireless communication of the printer PRT 1. These functions are constituted by hardware and/or software, and operate in synchronization with and cooperation with one another under the control of a main control unit 11.

A weighting information memory unit 12 stores a table T1 for storing received signal strength indicator ("RSSI") weights (RSSI weighting table), and a table T2 for storing channel weights of close channels (channel weighting table) as tables to be referred to in the channel automatic selection ad hoc network establishment function. The RSSI weighting table T1 is so designed as to add larger weight as RSSI increases. The channel weighting table T2 is so designed as to add larger weight as a frequency of a channel is set closer.

FIGS. 3A and 3B show examples of the respective tables. According to the examples shown in the figures, the RSSI weighting table T1 gives weight "2" when RSSI is −70 dB or higher. Also, the RSSI weighting table T1 gives weight "1" when RSSI is −80 dB or higher and lower than −70 dB, and gives weight "0" when RSSI is lower than −80 dB.

The channel weighting table T2 gives the maximum weight "5" to a process target channel X, and gives weight "5—(channel number difference)" to close channels having a channel number difference of 4 or smaller from the process target channel. The channel weighting table T2 does not give weight to channels having channel number difference of 5 or larger (in other words, the table T2 gives weight "0" to such channels). According to a wireless LAN in the band of 2.4 GHz currently available in Japan, channels 1 through 13 at the intervals of 5 MHz in the range from 2.412 GHz to 2.472 GHz are used, and two channels having a channel number difference of 5 or larger are so specified as not to cause radio interference between one another. Thus, in this representative example, it is unnecessary to consider the channels having a channel number difference of 5 or larger at the time of calculation of the radio interference power in the automatic channel selection ad hoc network establishment function.

A set information memory unit 13 stores communication set information referred to when the printer PRT 1 provides ad hoc wireless communication. Examples of the communication set information include various types of parameters such as SSID as identification information for grouping network, channel numbers, key information for establishing encode communication, and communication modes, and IP address set information (fixed address or automatic allocation function to be used, and the like), and other information. When the printer PRT 1 establishes ad hoc network (becomes creator), channel numbers are automatically selected and stored in the set information memory unit 13, as described later. The system of encode communication to be used may be WEP, TKIP, AES, or other known system.

An encode communication unit 14 has a function similar to that of an ordinary electronic device providing wireless communication for providing ad hoc wireless communication with an electronic device capable of providing wireless communication such as the digital camera DC1 while encoding or decoding by using communication set information stored in the set information memory unit 13.

An ad hoc network connection unit 15 has a function of automatically selecting a channel and establishing ad hoc network in addition to a function similar to known functions for entering an existing ad hoc network. More specifically, the ad hoc network connection unit 15 has a search unit 151, an RSSI measuring unit 152, a channel allocation unit 153, a radio interference power calculating unit 154, an ad hoc network establishing unit 155, and others for providing the channel automatic selection ad hoc network establishment function.

Automatic Channel Selection Ad Hoc Network Establishment Function

Figure 4:
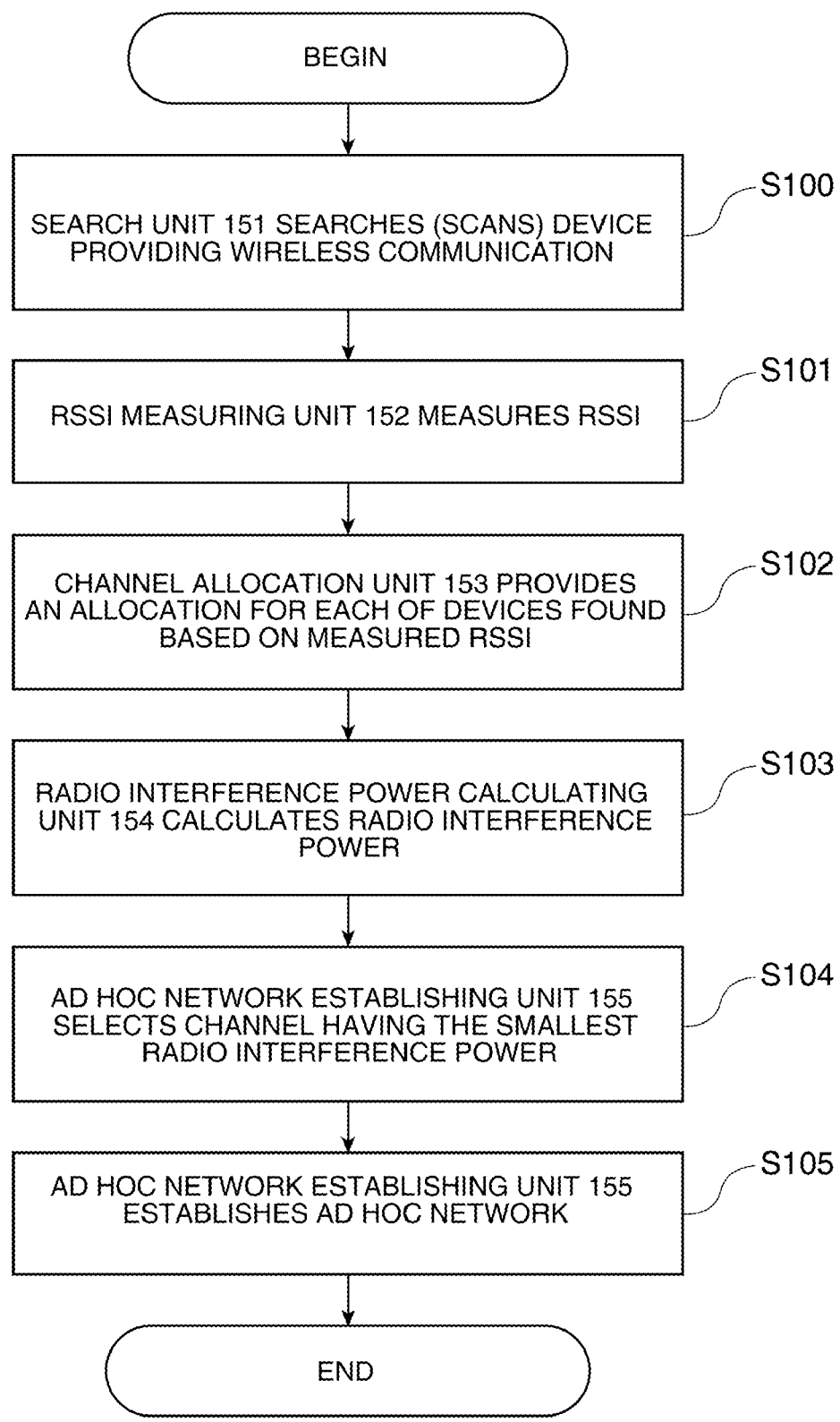
FIG. 4 is a flowchart illustrating an automatic channel selection ad hoc network establishment function.

The automatic channel selection ad hoc network establishment function provided by the ad hoc network connection unit 15 of the printer PRT 1 will now be described with reference to the flowchart shown in FIG. 4. The method or procedure is described in terms of firmware, software, and/or hardware with reference to the flowchart. Describing a method by reference to a flowchart enables one skilled in the art to develop programs, including instructions to carry out the processes and methods on suitably configured computer systems and processing devices. In various embodiments, portions of the operations to be performed by the ad hoc network connection unit 15 may constitute circuits, general purpose processors (e.g., micro-processors, micro-controllers, an ASIC, or digital signal processors), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured processing device executes the instructions from a storage and/or recording medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it may be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software causes the processor to perform an action or to produce a result.

In this specification, the order of the respective steps shown in the flowchart or the like (including partial steps to which no numbers are given) may be arbitrarily changed or performed in parallel to such an extent that the process contents do not become inconsistent.

For establishing an ad hoc network, the ad hoc network connection unit 15 of the printer PRT 1 performs the following processes.

The search unit 151 searches (scans) a device providing wireless communication in each of plural channels allowed for establishing ad hoc network (S100). In this embodiment, a wireless LAN in the band of 2.4 GHz is assumed as the wireless LAN 100. Thus, the channels allowed for establishing an ad hoc network are channels 1 to 13. Various known technologies can be used for the search of the device in each channel.

When the SSID of the ad hoc network established or entered by the device found by the search agrees with the SSID stored in the set information memory unit 13, the ad hoc network connection unit 15 stops establishment of ad hoc network and executes process for entering the existing ad hoc network having the coinciding SSID.

Subsequently, the RSSI measuring unit 152 measures the RSSI of wireless signals (such as beacon signals) received from the respective devices found by the search (S101). Various known technologies can be used for measuring the RSSI.

The channel allocation unit 153 provides an allocation for the channels through which the wireless signals are received from the devices found by the search for each of the devices while giving larger weight as the measured RSSI of the devices increases (S102).

More specifically, RSSI weight corresponding to the measured RSSI is obtained with reference to an RSSI weighting table, such as the RSSI weighting table T1, stored in the set information memory unit 13, and the obtained RSSI weight is added to allocation store parameters (e.g., initial value: 0) for the corresponding channel.

When the search result and RSSI measurement result shown in FIG. 5A are obtained for each of the devices, for example, the RSSI weight shown in the figure is given. Also, the allocation result (values of allocation store parameters) shown in FIG. 5B for each channel is given.

When allocation for all the devices found by search is completed, the radio interference power calculating unit 154 calculates radio interference power for each of the channels 1 through 13 based on the allocation result obtained by the channel allocation unit 153 (S103).

The radio interference power for each channel refers to an estimated value of the degree of radio interference expected to receive from the existing communication network in the peripheral area when the corresponding channel is selected to establish ad hoc network. The radio interference power is so estimated as to increase as RSSI of the device using the channel or the device using channels close to the channel becomes higher.

More specifically, in calculating the radio interference power of the channel X, the channel weight for the channel X, and channel weights for the close channels causing radio interference with the channel X, i.e., channels (X−4) through (X−1) and channels (X+1) through (X+4) having channel number difference of 4 or smaller in this embodiment are obtained with reference to a channel weighting table, such as channel weighting table T2, stored in the set information memory unit 13 while setting the channel X as the process target channel. Then, values obtained by multiplying the channel allocation results and the channel weights are summed for the channels (X−4) through (X+4) and determined as the radio interference power of the channel X. Channels not applicable or having channel number difference of 5 or larger are not added to the radio interference power.

The calculating unit calculating the radio interference power of a channel X using a relationship: $(R_x*C_x)+(R_{x-1}*C_{x-1})+(R_{x-2}*C_{x-2})+(R_{x-3}*C_{x-3})+(R_{x-4}*C_{x-4})+(R_{x+1}*C_{x+1})+(R_{x+2}*C_{x+2})+(R_{x+3}*C_{x+3})+(R_{x+4}*C_{x+4})$, where R is the allocation result, the allocation result increasing as the strength of the measured receiving level increases, and C is a predetermined weight based on a channel weighting table, the weight being larger as a frequency draws closer to the channel X.

In case of the allocation result shown in FIG. 5B, for example, the radio interference power for each channel shown in the figure can be obtained. For example, the radio interference power for channel 1 is 8×5+2×4+0×3+0×2+2×1=50, and the radio interference power for channel 2 is 8×4+2×5+0×4+0×3+2×2+1×1=47.

Subsequently, the ad hoc network establishing unit 155 selects the channel having the smallest radio interference power calculated by the radio interference power calculating unit 154, and stores the number of the selected channel in the set information memory unit 13 (S104). According to the example shown in FIG. 5B, channel 6 having a radio interference power of 22 is selected, and the corresponding information is stored.

Then, the ad hoc network establishing unit 155 establishes an ad hoc network by referring to the set information memory unit 13 (S105). More specifically, the ad hoc network establishing unit 155 executes an ad hoc network establishing process similar to known ad hoc network establishing process such as notifying a person nearby about the beacon signal containing information such as SSID stored in the set information memory unit 13 by using the selected channel.

According to the structure in this embodiment, radio interference power is calculated from the surrounding radio condition for each channel, and the channel having the smallest radio interference power is selected for establishing ad hoc network. Thus, the appropriate channel having less radio interference with the existing wireless communication network may be automatically selected for establishing an adhoc network.

Modified Example

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways.

For example, respective values stored in the weighting information memory unit 12 (such as RSSI boundary values, range of close channels, and weights) may be varied according to design.

While the wireless LAN in the band of 2.4 GHz based on IEEE 802.11 has been discussed in this embodiment, the disclosure is applicable to ad hoc wireless communication using wireless LAN in other frequency bands such as a 5 GHz band based on IEEE 802.11, and radio waves in conformity with standards of Bluetooth (registered trademark), HomeRF (trademark), or the like. When the disclosure is applied to wireless LAN in the band of 5 GHz, four channels of 5.170 GHz (channel 24), 5.190 GHz (channel 38), 5.210 GHz (channel 42), and 5.230 GHz (channel 46) are currently available in Japan. These channels are so specified that radio interference is not caused between two channels having channel number difference of 8 or larger. Thus, the channel weighting table T2 only needs to be designed as to give predetermined weight to close channels having channel number difference of 7 or smaller (4 or smaller in practical use) from the process target channel.

While RSSI has been used as a receiving level of wireless signals in this embodiment, receiving power, receiving electric field intensity, and other conditions may be used as the receiving level of the signals.

While the example where the digital camera DC1 enters the ad hoc network established by the printer PRT 1 has been discussed in this embodiment, the functions of the digital camera DC1 and the printer PRT 1 may be exchanged. In this case, the digital camera DC1 has functions similar to the functions of the weighting information memory unit 12 and the ad hoc network connection unit 15 of the printer PRT 1.

The electronic device capable of providing wireless communication according to the disclosure may be electronic devices other than printer and digital camera. Examples of an electronic device for wireless communication according to the disclosure include a server device (such as wireless print server), a projector, and a photo-viewer.

This disclosure is intended to cover any adaptations or variations of the embodiments discussed herein. Therefore, it is manifestly intended that embodiments in accordance with the present disclosure be limited only by the claims and the equivalents thereof.

What is claimed is:

1. An electronic device comprising:

a search unit configured to search wireless communication devices for each of plural channels provided for establishing an ad hoc network;

a measuring unit configured to measure a receiving level of wireless signals received from the devices found by the search;

an allocation unit configured to generate an allocation result for the channels through which the wireless signals are received from the devices by adding a predetermined weight to each of the channels based on a strength of the measured receiving level of the wireless signals;

a calculating unit configured to calculate a radio interference power for each of the channels based on the allocation result obtained by the allocation unit, the calculating unit calculating the radio interference power of a channel X using a relationship: $(R_x*C_x)+(R_{x-1}*C_{x-1})+(R_{x-2}*C_{x-2})+(R_{x-3}*C_{x-3})+(R_{x-4}*C_{x-4})+(R_{x+1}*C_{x+1})+(R_{x+2}*C_{x+2})+(R_{x+3}*C_{x+3})+(R_{x+4}*C_{x+4})$, where R is the allocation result, the allocation result increasing as the strength of the measured receiving level increases, and C is a predetermined weight based on a channel weighting table, the weight being larger as a frequency draws closer to the channel X; and an establishing unit configured to select the channel having a smallest radio interference power as calculated by the calculating unit and establish the ad hoc network for the selected channel.

2. The electronic device according to claim 1, wherein the receiving level of wireless signals is based on a received signal strength indicator.

3. The electronic device according to claim 1, wherein the ad hoc network is in a band of 2.4 GHz in conformity with IEEE 802.11.

4. The electronic device according to claim 1, wherein the electronic device is a printer.

5. The electronic device according to claim 1, wherein the electronic device is a projector.

6. An ad hoc network establishment method implemented by an electronic device comprising:

searching for wireless communication devices for each of plural channels allowed for establishing an ad hoc network;

measuring a receiving level of wireless signals received from the devices found by the search;

generating an allocation result for the channels through which the wireless signals are received from the devices by adding a larger weight to the channels as the measured receiving level of the signals of the devices increases;

calculating a radio interference power for each of the channels based on the allocation result, wherein calculating the radio interference power of a channel X using a relationship: $(R_x*C_x)+(R_{x-1}*C_{x-1})+(R_{x-2}*C_{x-2})+(R_{x-3}*C_{x-3})+(R_{x-4}*C_{x-4})+(R_{x+1}*C_{x+1})+(R_{x+2}*C_{x+2})+(R_{x+3}*C_{x+3})+(R_{x+4}*C_{x+4})$, where R is the allocation result, the allocation result increasing as the strength of the measured receiving level increases, and C is a predetermined weight based on a channel weighting table, the weight being larger as a frequency draws closer to the channel X;

selecting the channel having the smallest radio interference power; and establishing the ad hoc network for the selected channel.

7. A computer program product comprising a non-transitory computer readable storage medium encoded thereon computer instructions executable by a processor of the electronic device to implement the method according to claim 6.

* * * * *